United States Patent
Pastore et al.

(10) Patent No.: US 10,943,316 B2
(45) Date of Patent: Mar. 9, 2021

(54) SYSTEMS AND METHODS FOR IDENTIFYING COMMERCIAL VACANCIES

(71) Applicant: MasterCard International Incorporated, Purchase, NY (US)

(72) Inventors: Jeremy Michael Pastore, Brooklyn, NY (US); Melinda L. Rolfs, Pleasantville, NY (US); Michael Lester Zhao, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 645 days.

(21) Appl. No.: 15/190,538

(22) Filed: Jun. 23, 2016

(65) Prior Publication Data
US 2017/0372440 A1 Dec. 28, 2017

(51) Int. Cl.
*G06Q 50/16* (2012.01)
*H04L 29/08* (2006.01)

(52) U.S. Cl.
CPC .......... *G06Q 50/163* (2013.01); *H04L 67/306* (2013.01)

(58) Field of Classification Search
USPC ........................................................ 705/314
See application file for complete search history.

(56) References Cited

U.S. PATENT DOCUMENTS

| | | | |
|---|---|---|---|
| 7,254,559 B2 | 8/2007 | Florance et al. | |
| 2002/0123959 A1* | 9/2002 | Mozley | G06Q 30/0601 705/37 |
| 2009/0132316 A1* | 5/2009 | Florance | G06Q 30/06 701/532 |
| 2011/0184872 A1* | 7/2011 | McNeill | G06Q 10/06 705/313 |
| 2014/0101249 A1* | 4/2014 | Lampe | H04L 65/403 709/204 |
| 2015/0012303 A1 | 1/2015 | Ghosh | |
| 2015/0154717 A1* | 6/2015 | Stibel | G06Q 40/12 705/30 |

(Continued)

FOREIGN PATENT DOCUMENTS

JP 2002140413 A * 5/2002

OTHER PUBLICATIONS

Retail Solutions Advisors, Commercial Property Managers: What Do They Do?, archived on Oct. 15, 2015 at https://web.archive.org/web/20151001080517/https://www.retailsolutionsadvisors.com/connnnercial-real-estate-blog-2/helpful-tips-when-choosing-a-commercial-property-management-company/ (Year: 2015).*

*Primary Examiner* — Michael Young
(74) *Attorney, Agent, or Firm* — Armstrong Teasdale LLP

(57) ABSTRACT

A vacancy identification (VI) computing device is provided. The VI computing device includes a processor in communication with a memory. The processor generates a storefront profile including a status indicator for a candidate storefront located at a commercial property, stores the storefront profile within the memory, and registers a user to receive notifications for the candidate storefront. The processor also receives transaction data associated with the candidate storefront for a predetermined period of time, determines that the candidate storefront is vacant based on the transaction data, updates the status indicator to indicate that the candidate storefront is vacant, and transmits a notification to the registered user advising the registered user that the candidate storefront is vacant.

18 Claims, 7 Drawing Sheets

(56) References Cited

U.S. PATENT DOCUMENTS

2015/0221051 A1* 8/2015 Settino .................. G06Q 10/06
705/305
2015/0332371 A1 11/2015 Lomas

* cited by examiner

SYSTEMS AND METHODS FOR IDENTIFYING COMMERCIAL VACANCIES

BACKGROUND

The field of the disclosure relates generally to identifying vacancies, and more specifically, identifying vacancies in commercial properties using transaction data.

The location of a merchant store may influence the performance of a merchant. Merchant store locations near wealthier areas, major roadways or attractions, and/or areas with significant foot traffic of potential customers may result in increased sales in comparison to, for example, a merchant store located in a small town with only a little foot traffic near the location. In particular, commercial properties such as a shopping mall and other large shopping areas are desirable locations to attract additional customers. These commercial properties may attract potential customers to shop at a variety of merchants by providing a condensed area of merchant stores. Each commercial property generally includes a plurality of storefronts that may be leased, rented, or purchased by merchants to establish a merchant store in the commercial property. However, these commercial properties include a finite number of storefronts for merchants, and as a result, the demand for these storefronts may be greater than the demand for other merchant store locations (e.g., a standalone merchant store in a small town). If a storefront of the commercial property becomes vacant, one or more merchants may wish to add a merchant store in the vacant storefront.

However, in some known systems, a merchant may have difficulty detecting vacant storefronts without visiting or actively monitoring each commercial property. For example, property management of a commercial property that becomes vacant may simply lock the vacant storefront and place a phone number in a window of the storefront for interested merchants to contact. In another example, the property management may have to contact numerous merchants regarding the vacant storefront before finding one interested in occupying it. Some merchants interested in establishing a merchant store at the commercial property may not be aware of the vacant storefront and do not have the opportunity to contact the property management.

BRIEF DESCRIPTION

In one aspect, a vacancy identification (VI) computing device is provided. The VI computing device includes a processor in communication with a memory. The processor generates a storefront profile including a status indicator for a candidate storefront located at a commercial property, stores the storefront profile within the memory, and registers a user to receive notifications regarding the candidate storefront. The processor also receives transaction data associated with the candidate storefront for a predetermined period of time, determines that the candidate storefront is vacant based on the transaction data, updates the status indicator to indicate that the candidate storefront is vacant, and transmits a notification to the registered user advising the registered user that the candidate storefront is vacant.

In another aspect, a computer-implemented method for identifying commercial vacancies is provided. The method is performed, at least partially, by a VI computing device. The method includes generating a storefront profile including a status indicator for a candidate storefront of a commercial property, storing the storefront profile within a memory associated with the VI computing device, and registering a user to receive notifications regarding the candidate storefront. The method also includes receiving transaction data associated with the candidate storefront, determining that the candidate storefront is vacant based on the transaction data, updating the status indicator to indicate that the candidate storefront is vacant, and transmitting a notification to the registered user advising the registered user that the candidate storefront is vacant.

In yet another aspect, computer-readable storage media for identifying commercial vacancies is provided. The computer-readable storage media has computer-executable instructions embodied thereon that, when executed by at least one processor, cause the processor to generate a storefront profile including a status indicator for a candidate storefront located at a commercial location store the storefront profile within a memory associated with the processor, and register a user to receive notifications regarding the candidate storefront. The computer-executable instructions further cause the processor to receive transaction data associated with the candidate storefront, determine that the candidate storefront is vacant based on the transaction data, update the status indicator to indicate that the candidate storefront is vacant, and transmit a notification to the registered user advising the registered user that the candidate storefront is vacant.

DETAILED DESCRIPTION

Figure 1:
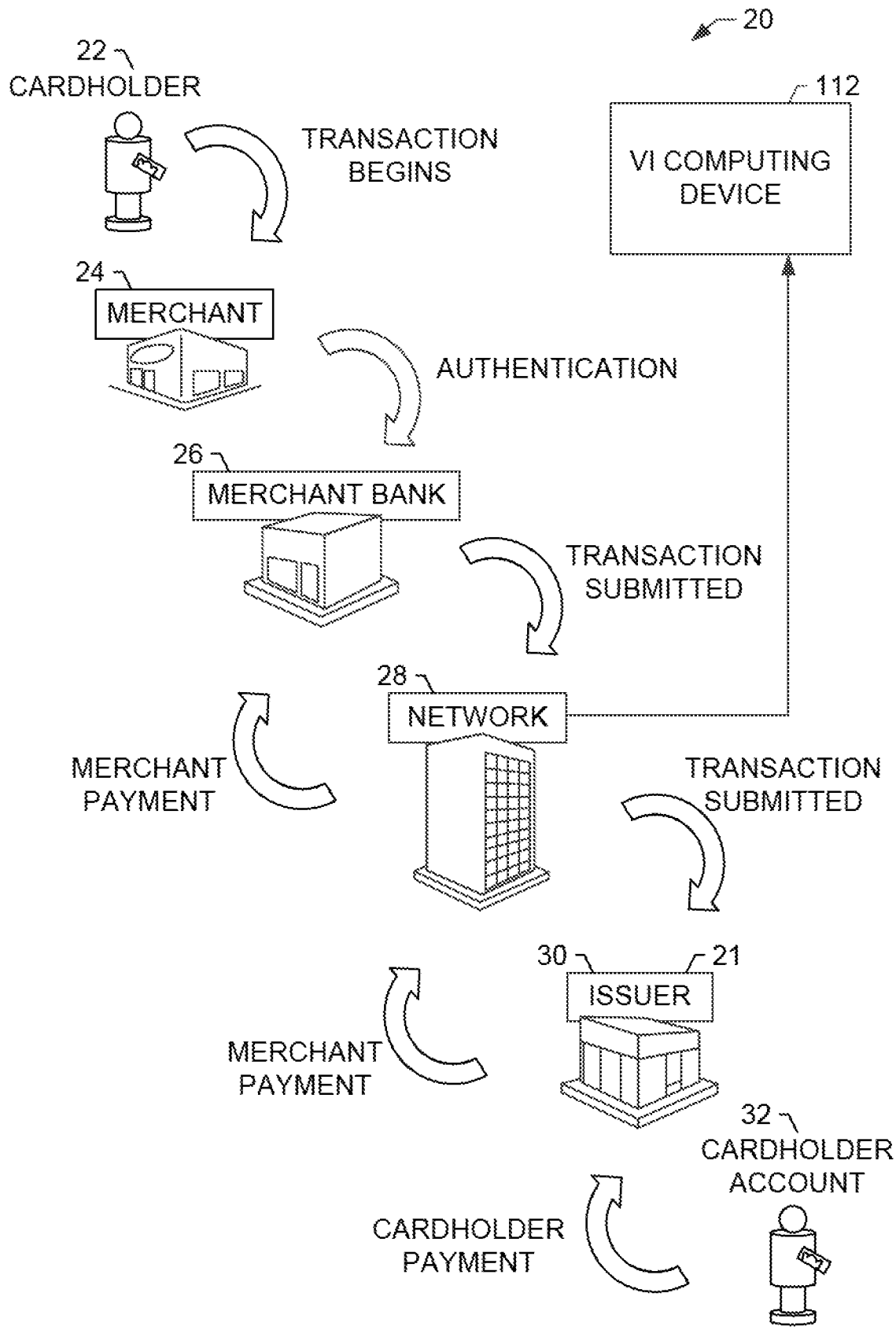
FIG. 1 is an example vacancy analytics system for identifying commercial vacancies.

The system described herein, which is referred to herein as a "vacancy analytics system", is configured to identify commercial vacancies using transaction data of cardholders and notify merchants of the commercial vacancies. More specifically, the vacancy analytics system is configured to (i) determine that a storefront of a commercial property is vacant based on transaction data from the storefront, and (ii) alert one or more interested merchants of the vacant storefront to contact property management of the commercial property. The vacancy analytics system includes a vacancy identification (VI) computing device in communication with a payment processor configured to process payment transactions and/or a database that stores data related to the transactions ("transaction data"). The VI computing device includes a processor in communication with a memory. The VI computing device is in communication with at least one database for storing information, such as information about the commercial properties and the interested merchants.

In the example embodiment, the VI computing device is configured to (i) generate a storefront profile for a candidate storefront of a commercial property, wherein the storefront profile includes a status indicator; (ii) store the storefront profile within a memory associated with the VI computing device; (iii) receive transaction data associated with the commercial property; (iv) determine that the candidate storefront is vacant based on the transaction data; (v) update the status indicator to indicate that the candidate storefront is vacant; and (vi) transmit a notification to a registered merchant advising the registered merchant that the candidate storefront is vacant.

To identify each storefront in a commercial property, the VI computing device is configured to generate a storefront profile for each storefront of the commercial property. The storefront profile is stored within a memory associated with the VI computing device for further analysis. The storefront profile includes a status indicator and attributes of the storefront, such as, for example, dimensions of the storefront, location of the storefront within the commercial property, and other information about the storefront. In some embodiments, the storefront profile may include a merchant identifier for occupied storefronts and other information that may enable the VI computing device to determine what transaction data is associated with the storefront. The status indicator indicates whether the storefront is vacant (e.g., "Vacancy" or "No Vacancy"). In some embodiments, the status indicator may include additional statuses, such as "Potentially Vacant" and "Undetermined". The VI computing device may receive information about the commercial property from a computing device associated with property management of the commercial property and/or a third party associated with the property management to generate the storefront profile.

The VI computing device is configured to receive a registration request from one or more merchant computing devices associated with merchants that wish to monitor at least one storefront and/or commercial property for vacancies. Although merchants are referred to herein, it is to be understood that other users (banks, cardholders, and other users) may register with the VI computing device. The registration request includes contact information for the merchant to enable the VI computing device to alert the merchant of vacant storefronts as described herein. The registration request further includes one or more desired storefronts and/or storefront attributes. For example, a merchant may desire to monitor a particular storefront. In another example, a merchant may desire to know of any vacancies within a commercial property that exceed dimensions (e.g., floor space, ceiling height, etc.) specified by the merchant. In some embodiments, the registration request may include a desired storefront that does not have a storefront profile stored in the memory associated with the VI computing device. For example, a strip mall near the commercial property may be a desirable alternative for a merchant to monitor. The VI computing device may generate a storefront profile for the desired storefront. In some embodiments, the VI computing device may check to determine whether the desired storefront indicated by the merchant is a storefront or commercial property. In one example, the VI computing device does not generate a storefront profile if the desired storefront is determined to be a residential location.

The VI computing device is configured to receive transaction data, for example, from the payment processor included within a transaction processing network. Transaction data includes such elements as a transaction amount, a description of the purchase made, a merchant identifier, an account identifier (associating the transaction with a consumer or account holder), a time and date stamp, and a location identifier. The location identifier identifies where the transaction was initiated (i.e., a location of the consumer) and/or the location of the merchant. The transaction data is associated with transactions over a predetermined period of time (e.g., an hour, a day, a week, etc.). The transaction data is associated with at least one storefront of a commercial property. The VI computing device is configured to identify a portion of the transaction data that is associated with each storefront monitored by a merchant. In the example embodiment, each location identifier indicates a point-of-sale (POS) device that is associated with a storefront. The location identifier represents the merchant location where the corresponding transaction was initiated. In some embodiments, the merchant identifier may be associated with a storefront while a merchant occupies the storefront (and before the storefront is determined to be vacant). In the example embodiment, the VI computing device is configured to analyze the received transaction data for transactions associated with storefront profiles of one or more storefront queues. In some embodiments, the VI computing device analyzes the received transaction data for each storefront queue at different frequencies (e.g., the occupied queue is check more frequently than the vacant queue).

The VI computing device is configured to determine the vacancy of a storefront based on the transaction data associated with the storefront. The VI computing device determines the vacancy based on the volume and/or frequency of transactions processed at the storefront. For example, the VI computing device may observe the number of transactions processed at a storefront over a predetermined period of time (e.g., the past two weeks) has declined to almost zero transactions. The VI computing device may determine the transaction data indicates that the storefront is vacant. In some embodiments, the VI computing device may be configured to observe transaction data from the payment processor over a predefined period of time to prevent any false indication of vacancy, such as during maintenance closures of the storefront. In some embodiments, the VI computing device may require approval from the property management to declare the storefront vacant.

If the storefront is determined to be vacant, the VI computing device updates the status indicator in the storefront profile to indicate that the storefront is vacant. If the VI computing device determines that the status indicator of a merchant profile has changed based on the transaction data, the VI computing device updates the storefront queues. More specifically, the VI computing device may transfer storefront profiles to a different storefront queue when the status indicator of the storefront profiles change. The VI computing device may update the storefront profile to remove the previous merchant from the storefront such as removing any merchant identifiers in the storefront profile. The storefront is now available for other merchants.

In the example embodiment, the VI computing device is configured to generate and maintain one or more storefront queues of storefront profiles for the commercial property. Each queue may be associated with a status of the status indicator. For example, a first storefront queue may include storefront profiles that have an "Occupied" status (also referred to as an "occupied queue"). A second storefront queue may include storefront profiles that have a "Vacant" status ("vacant queue") and a third storefront queue may include storefront profiles that have a "Potentially Vacant" status ("potentially vacant queue").

In one example, a candidate storefront is associated with an entry in the occupied queue. The VI computing device receives transaction data and determines that the transactions associated with the candidates storefront have decreased below a threshold value. A status indicator of a storefront profile of the candidate storefront is updated as "Potentially Vacant" and the entry is moved to the potentially vacant queue. The VI computing device continues to monitor The VI computing device is configured to alert at least one merchant interested in the storefront of the vacancy. In the example embodiment, the VI computing device transmits a notification to at least one registered merchant advising the registered merchant that the storefront is vacant. In one embodiment, the VI computing device generates a priority list that ranks interested merchants and enables high priority merchants to contact the property management about securing the vacant storefront before low priority merchants. The priority list may be ranked by, for example, duration of interest, closest match to the storefront, and custom ranking by the property management. The duration of interest indicates how long the merchant has been registered to monitor the storefront. The closest match gives priority to merchants specifying the vacant storefront and merchants that list desired storefront attributes close to the storefront attributes of the vacant storefront. The property management may create a customized priority list or alter an existing priority list to fit the interests of the commercial property. For example, the property management may place a higher priority on toy merchants than clothing merchants to meet demand for more toy merchants. In one embodiment, a real estate agent associated with the property management may select interested merchants to prioritize.

The notification from the VI computing device includes contact information of the property management or a third party associated with the property management to discuss securing the vacant storefront to open a new merchant store. After a predetermined period of time or after receiving an indication from the merchant with the highest priority or the property management that no agreement was made, the VI computing device transmits the notification to the next merchant on the priority list and continues until the end of the priority list or a merchant secures the vacant storefront. In some embodiments, the VI computing device monitors the transaction data and determines the storefront is now occupied by the merchant. The VI computing device updates the status indicator in the storefront profile to indicate the storefront is not vacant anymore.

In another embodiment, the VI computing device may alert a plurality of interested merchants to auction the vacant storefront. The VI computing device may be configured to receive bids for the vacant storefront until a highest bidding merchant is determined. In one embodiment, the auction is conducted to gain priority to negotiate with the property management. In another embodiment, the auction is conducted to determine a buyer, renter, or lessee of the storefront. The VI computing device may be configured to enable the property management to accept or decline the highest bidding merchant. If the storefront is secured, the VI computing device updates the status indicator to indicate the storefront is now occupied.

The systems and methods described herein are configured to facilitate (a) reduced time to identify commercial vacancies; (b) proactive business strategies for merchants to capitalize on the commercial vacancies such as monitoring storefronts with desired attributes and locations; (c) automatic identification of commercial vacancies without requiring property management to advertise; and (d) increased awareness of commercial vacancies for remote merchants that may not have access to or frequently monitor the advertisements from the property management.

The technical effects of the systems and methods described herein can be achieved by performing at least one of the following steps: (i) generating a storefront profile including a status indicator for a candidate storefront of a commercial property, wherein the storefront profile; (ii) storing the storefront profile within a memory associated with a VI computing device; (iii) receiving transaction data associated with the candidate storefront; (iv) determining that the candidate storefront is vacant based on the transaction data; (v) updating the status indicator to indicate that the candidate storefront is vacant; and (vi) transmitting a notification to a registered user advising the registered user that the candidate storefront is vacant.

The following detailed description of the embodiments of the disclosure refers to the accompanying drawings. The same reference numbers in different drawings may identify the same or similar elements. Also, the following detailed description does not limit the claims.

Described herein are computer systems such as VI computing devices and user computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the determination and analysis of characteristics of devices used in payment transactions.

FIG. 1 is a schematic diagram illustrating an example multi-party transaction card industry system 20 for enabling ordinary payment-by-card transactions, including payment-by-card transactions made by cardholders using cardholder computing devices to initiate transactions at an online merchant, in which merchants 24 and card issuers 30 do not need to have a one-to-one special relationship. Typical financial transaction institutions provide a suite of interactive, online applications to both current and prospective customers. For example, a financial transactions institution may have a set of applications that provide informational and sales information on their products and services to prospective customers, as well as another set of applications that provide account access for existing cardholders.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. Cardholder 22 may purchase goods and services ("products") at merchant 24. Cardholder 22 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card or virtual transaction card, merchant 24 requests authorization from a merchant bank 26 for the amount of the purchase. The request may be performed over the telephone or electronically, but is usually performed through the use of a point-of-sale terminal, which reads cardholder's 22 account information from a magnetic stripe, a chip, or embossed characters on the transaction card and communicates electronically with the transaction processing computers of merchant bank 26. Merchant 24 receives cardholder's 22 account information as provided by cardholder 22. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. In the example embodiment, transaction data including such additional transaction data may also be provided to systems including vacancy identification (VI) computing device 112. In the example embodiment, interchange network 28 (also referred to as "payment network 28") provides such transaction data and additional transaction data such as historical transaction data. In alternative embodiments, any party may provide such transaction data and historical transaction data to VI computing device 112.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described below in more detail, VI computing device 112 may be used to identify commercial vacancies using transaction data received from, for example, interchange network 28 and alert users such as merchant 24. Although the users described herein are referred to as merchants, it is to be understood that other users such as cardholders and real estate agents may register for alerts. Although the systems described herein are not intended to be limited to facilitate such applications, the systems are described as such for exemplary purposes.

Figure 2:
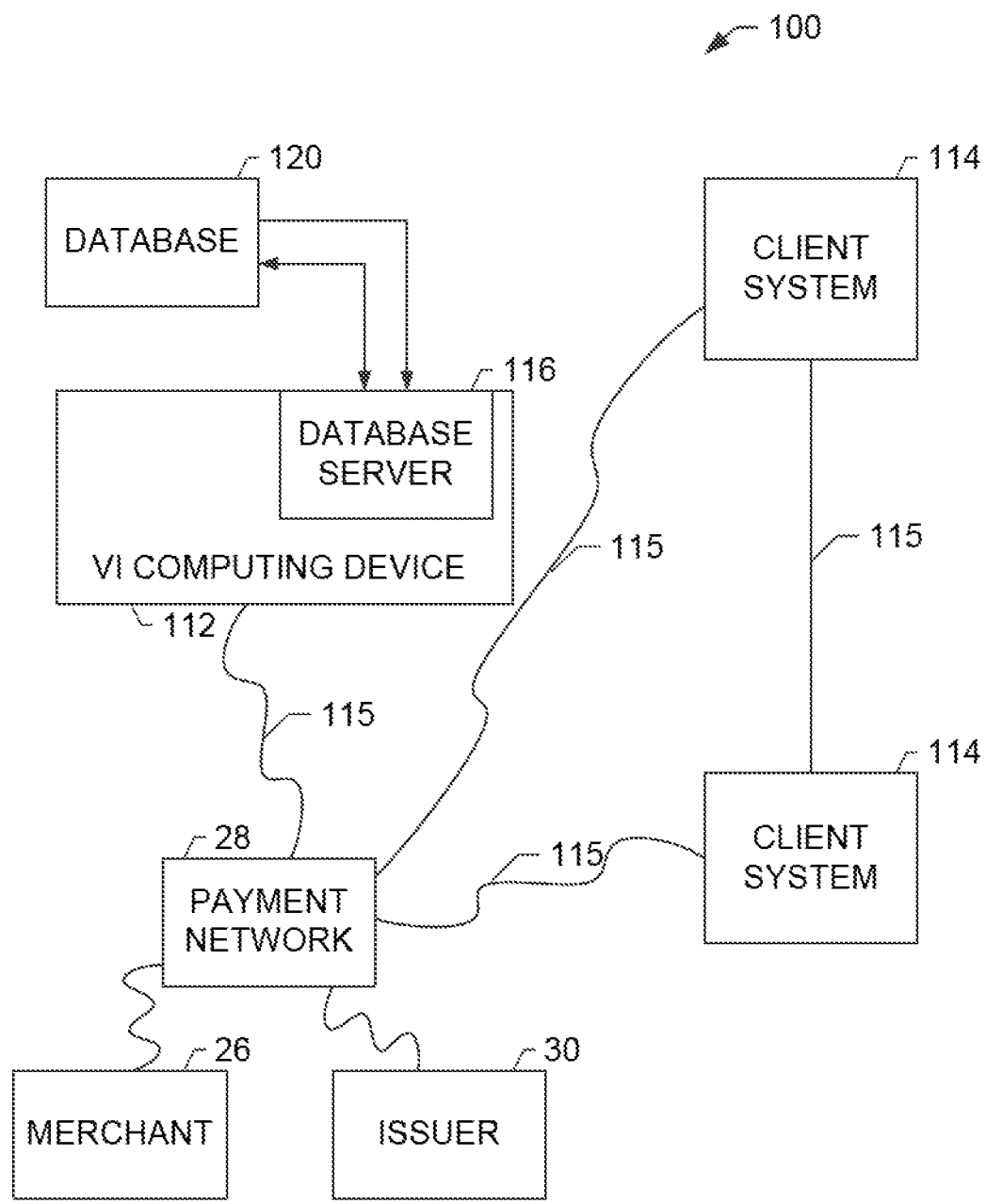
FIG. 2 is an expanded block diagram of an example embodiment of server architecture used in the vacancy analytics system shown in FIG. 1.

FIG. 2 is a simplified block diagram of an example computer system 100 used to identify commercial vacancies in accordance with the present disclosure. In the example embodiment, system 100 is used for generating a storefront profile including a status indicator for a candidate storefront of a commercial property, storing the storefront profile within a memory, receiving transaction data associated with the commercial property, determining that the candidate storefront is vacant based on the transaction data, updating the status indicator to indicate that the candidate storefront is vacant, and transmitting a notification to a registered merchant advising the registered merchant that the candidate storefront is vacant, as described herein. In other embodiments, the applications may reside on other computing devices (not shown) communicatively coupled to system 100, and may identify commercial vacancies using system 100.

More specifically, in the example embodiment, system 100 includes VI computing device 112, and a plurality of client sub-systems, also referred to as client systems 114, connected to VI computing device 112. In one embodiment, client systems 114 are computers including a web browser, such that VI computing device 112 is accessible to client systems 114 using the Internet. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 may include systems associated with cardholders 22 (shown in FIG. 1) as well as external systems used to store review data ("external review resources"). VI computing device 112 is also in communication with payment network 28 using network 115. Further, client systems 114 may additionally communicate with payment network 28 using network 115. Client systems 114 could be any device capable of interconnecting to the Internet including a web-based phone, PDA, or other web-based connectable equipment. In the example embodiment, client systems 114 include one or more POS devices at a commercial property.

A database server 116 is connected to database 120, which contains information on a variety of matters, as described below in greater detail. In one embodiment, centralized database 120 is stored on VI computing device 112 and can be accessed by potential users at one of client systems 114 by logging onto VI computing device 112 through one of client systems 114. In an alternative embodiment, database 120 is stored remotely from VI computing device 112 and may be non-centralized.

Database 120 may include a single database having separated sections or partitions, or may include multiple databases, each being separate from each other. Database 120 may store transaction data generated over the processing network including data relating to merchants, account holders, prospective customers, issuers, acquirers, and/or purchases made. Database 120 may also store account data including at least one of a cardholder name, a cardholder address, an account number, other account identifiers, and transaction information. Database 120 may also store merchant information including a merchant identifier that identifies each merchant registered to use the network, and instructions for settling transactions including merchant bank account information. Database 120 may also store purchase data associated with items being purchased by a cardholder from a merchant, and authorization request data. Further, as described herein, database 120 may contain historical transaction data, transaction data, storefront profiles, merchant profiles, and priority lists.

In the example embodiment, one of client systems 114 may be associated with acquirer bank 26 (shown in FIG. 1) while another one of client systems 114 may be associated with issuer bank 30 (shown in FIG. 1). VI computing device 112 may be associated with interchange network 28. In the example embodiment, VI computing device 112 is associated with a network interchange, such as interchange network 28, and may be referred to as an interchange computer system. VI computing device 112 may be used for processing transaction data. In addition, client systems 114 may include a computer system associated with at least one of an online bank, a bill payment outsourcer, an acquirer bank, an acquirer processor, an issuer bank associated with a transaction card, an issuer processor, a remote payment system, customers and/or billers.

Figure 3:
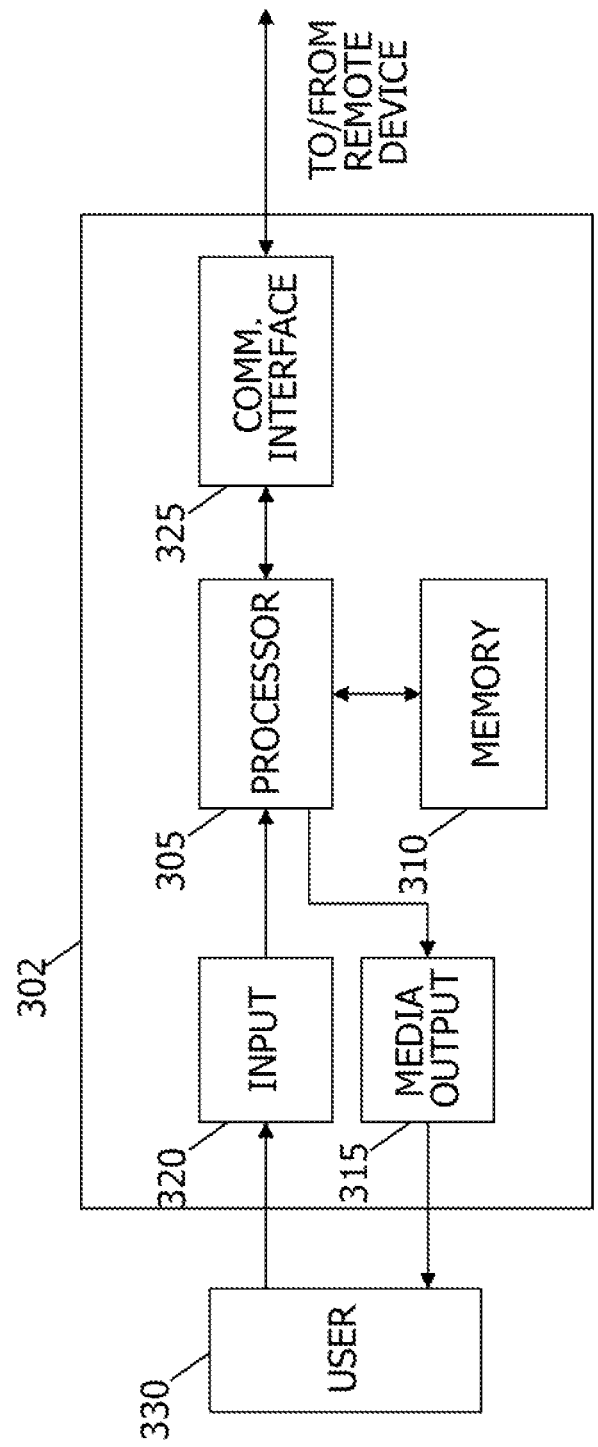
FIG. 3 illustrates an example configuration of a remote computing device used to identify commercial vacancies in accordance with one example embodiment of the present disclosure.

FIG. 3 depicts an exemplary configuration of a user or remote computing device 302. Computing device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or other data to be stored and retrieved. Memory area 310 may include one or more computer-readable media.

Computing device 302 may also include at least one media output component 815 for presenting information to a user 330. Media output component 315 may be any component capable of conveying information to user 330. In some embodiments, media output component 315 may include an output adapter, such as a video adapter and/or an audio adapter. An output adapter may be operatively coupled to processor 305 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 315 may be configured to present an interactive user interface (e.g., a web browser or client application) to user 330.

In some embodiments, computing device 302 may include an input device 320 for receiving input from user 330. Input device 320 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 315 and input device 320.

Computing device 302 may also include a communication interface 325, which may be communicatively coupleable to a remote device such as insurance computing device 130 (shown in FIG. 1). Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer-readable instructions for providing a user interface to user 330 via media output component 315 and, optionally, receiving and processing input from input device 320. A user interface may include, among other possibilities, a web browser and client application. Web browsers enable users 330 to display and interact with media and other information typically embedded on a web page or a website from a web server associated with a merchant. A client application allows users 330 to interact with a server application associated with, for example, a vendor or business.

Figure 4:
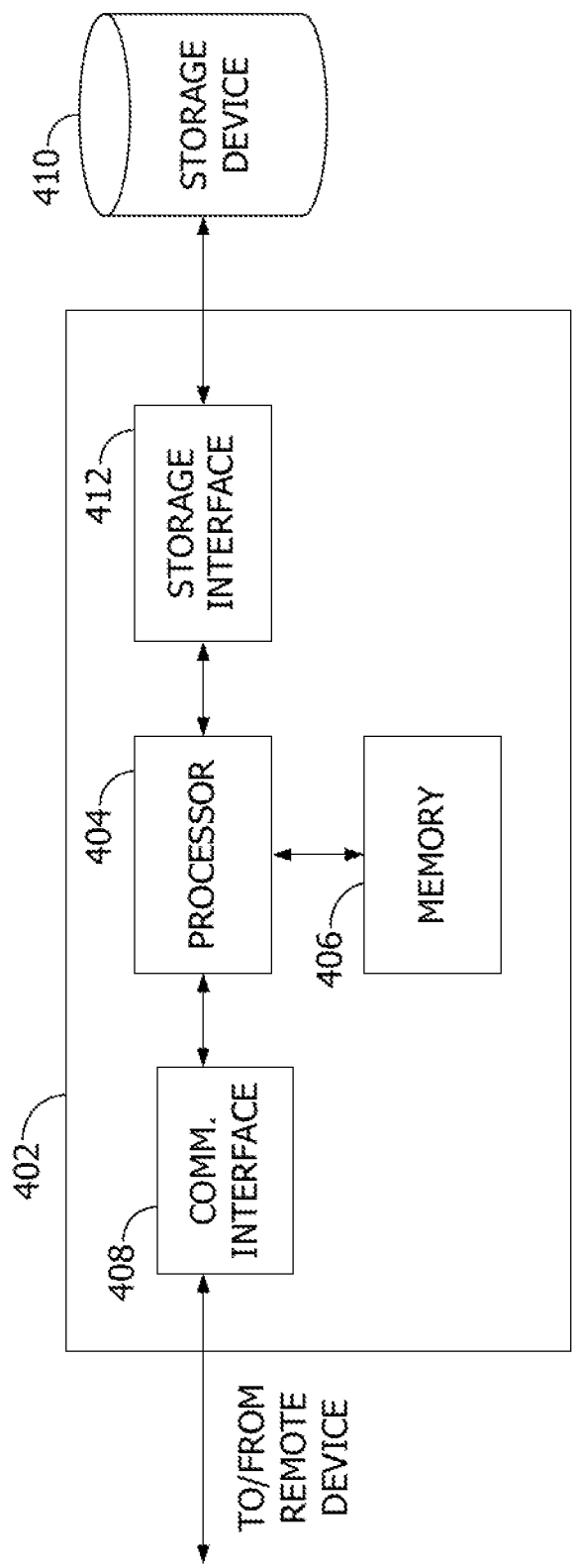
FIG. 4 illustrates an example configuration of a host system such as the vacancy identification computing device of FIG. 2 used to identify commercial vacancies in accordance with one example embodiment of the present disclosure.

FIG. 4 depicts an exemplary configuration of a host computing device 402. Host computing device 402 may include a processor 404 for executing instructions. Instructions may be stored in a memory area 406, for example. Processor 404 may include one or more processing units (e.g., in a multi-core configuration).

Processor 404 may be operatively coupled to a communication interface 408 such that host computing device 402 may be capable of communicating with a remote device such as computing device 302 shown in FIG. 3 or another host computing device 402. For example, communication interface 408 may receive requests from user computing device 302 via the Internet.

Processor 404 may also be operatively coupled to a storage device 410. Storage device 410 may be any computer-operated hardware suitable for storing and/or retrieving data. In some embodiments, storage device 410 may be integrated in host computing device 402. For example, host computing device 402 may include one or more hard disk drives as storage device 410. In other embodiments, storage device 410 may be external to host computing device 402 and may be accessed by a plurality of host computing devices 402. For example, storage device 410 may include multiple storage units such as hard disks or solid state disks in a redundant array of inexpensive disks (RAID) configuration. Storage device 410 may include a storage area network (SAN) and/or a network attached storage (NAS) system.

In some embodiments, processor 404 may be operatively coupled to storage device 410 via a storage interface 412. Storage interface 412 may be any component capable of providing processor 404 with access to storage device 410. Storage interface 412 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 404 with access to storage device 410.

Memory areas 310 (shown in FIG. 3) and 406 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 5:
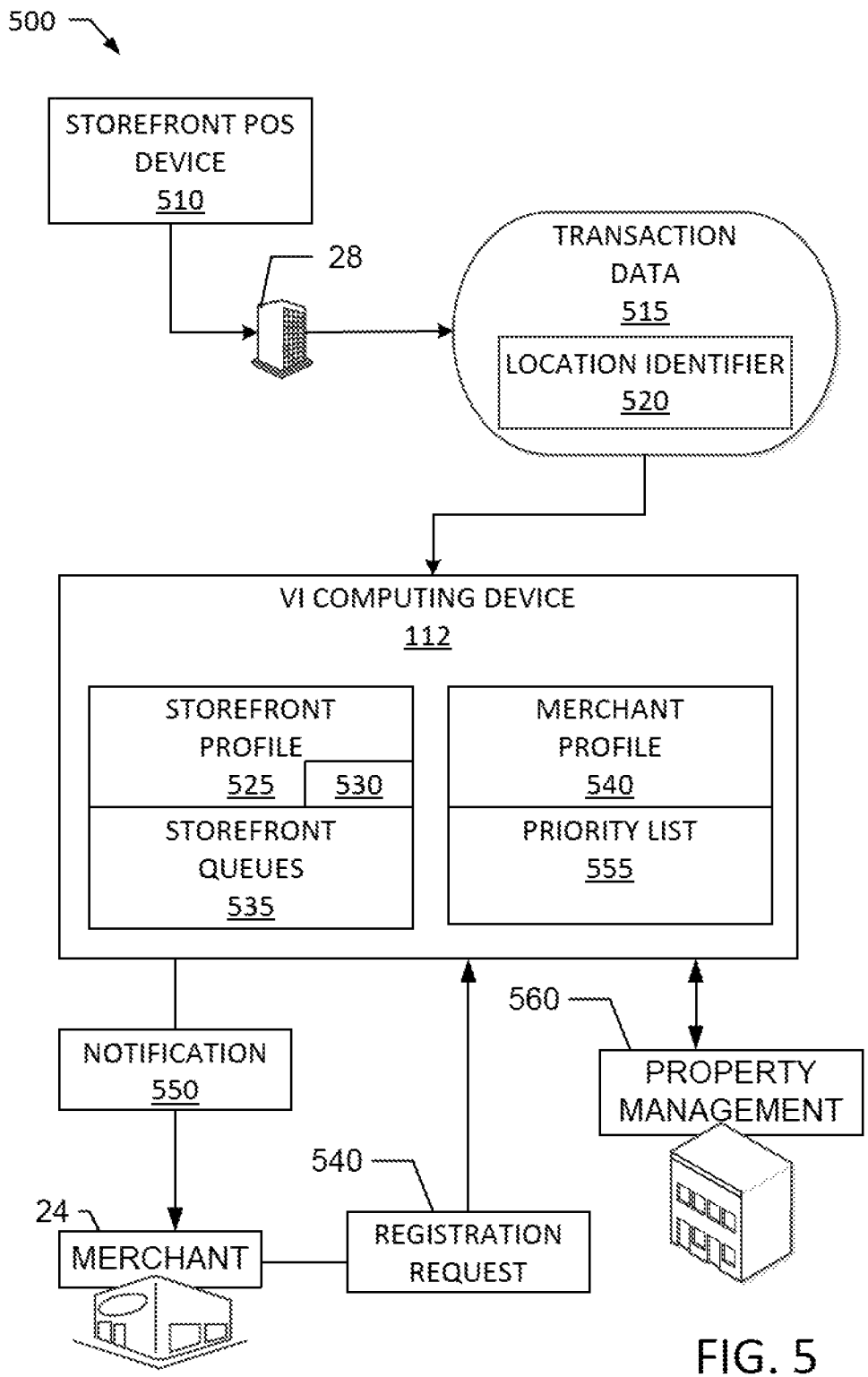
FIG. 5 is a simplified data flow diagram of identifying commercial vacancies using the systems of FIGS. 2, 3, and 4.

FIG. 5 is a flow diagram of a commercial vacancy system 500. In the example system, system 500 includes merchant 24, payment network 28, VI computing device 112, a storefront POS device 510, and a property management 560. In other embodiments, system 500 may include additional, fewer, or alternative components to identify commercial vacancy, including those described elsewhere herein. In some embodiments, merchant 24 and property management 560 may be associated with a computing device such as computing device 402 (shown in FIG. 3) and/or host computing device 502 (shown in FIG. 4).

VI computing device 112 receives transaction data 515 from payment network 28. Transaction data 515 is associated with one or more purchases made at a commercial property over a predetermined period of time. In at least some embodiments, transaction data 515 is associated with purchases made at a plurality of commercial properties. The commercial property may be, for example, a mall, a strip mall, or another property occupied by one or more merchants. In the example embodiment, the commercial property is a shopping mall with a plurality of storefronts for a plurality of merchants. Each storefront may be occupied by one or more merchants or vacant. In the illustrated embodiment, one storefront is occupied by merchant associated with storefront POS device 510. Storefront POS device 510 receives payment information from customers (e.g., PAN, expiration date, customer name, etc. from a customer's payment card) at the storefront of the merchant and transmits the payment information to payment network 28 for processing. The payment information may be included in transaction data 515. In addition to the payment information, transaction data 515 may include other elements or parameters, including, but not limited to, transaction amounts, transaction date and time, transaction location, merchant identifiers, and customer identifiers.

In the illustrated embodiment, transaction data 515 includes a location identifier 520 for each transaction. Location identifier 520 may be used to identify a storefront associated with the transaction. For example, location identifier 520 may indicate a particular storefront POS device 510 used to initiate a transaction. VI computing device 112 may be configured to analyze location identifier 520 to identify a storefront associated with each transaction of transaction data 515. VI computing device 112 may store a table of storefront POS devices 510 and associated merchants and/or storefronts to identify the storefront. In another example, location identifier 520 may include a merchant identifier. If the storefront associated with the merchant is known, VI computing device 112 may associate transactions including the merchant identifier with the corresponding storefront.

VI computing device 112 is configured to generate one or more storefront profiles 525 associated with the storefronts of the commercial property. In the example embodiment, VI computing device 112 stores storefront profiles 525 locally. In other embodiments, storefront profiles 525 are stored in a memory associated with VI computing device 112, such as database 120 shown in FIG. 2. Storefront profiles 525 includes a status indicator 530 and attributes of the storefront, such as, for example, storefront dimensions, location within the commercial property, historical cost (e.g., cost to lease, rent, and/or own the storefront), estimated or listed current cost, previous occupants, current occupant, and other information about the storefront. Status indicator 530 indicates whether the storefront is vacant or occupied (e.g., "Vacancy", "No Vacancy", or "Occupied"). In some embodiments, status indicator 530 may include additional statues, such as "Potentially Vacant" and "Undetermined". In the example embodiment, to generate storefront profiles 525, VI computing device 112 receives at least a portion of the storefront attributes from property management 560 of the commercial property. For example, VI computing device 112 may receive blueprints or storefront dimensions from property management computing device 525. VI computing device 112 is configured to permit merchant 24 and property management 560 to access storefront profiles 525 to view each storefront at the commercial property. In certain embodiments, VI computing device 112 may also receive desired merchant attributes from property management 560 to be included in storefront profiles 525. Example storefront profiles are shown below in Table 1.

TABLE 1

| Storefront | Vacant? (Y/N) | Current Occupant | Previous Occupant | Square Feet (ft$^2$) | Estimated Rent |
|---|---|---|---|---|---|
| Storefront A | Y | N/A | Company W | 300 | $1250 |
| Storefront B | N | Company A | Company X | 450 | $1500 |
| Storefront C | Y | N/A | Company Y | 120 | $845 |
| Storefront D | N | Company B | Company Z | 240 | $900 |

In the example embodiment, VI computing device 112 stores each storefront profile 525 into one or more storefront queues 535. VI computing device 112 is configured to monitor transaction data 515 for transactions associated with at least one storefront queue 535 at a predetermined frequency to update status indicators 530. In the example embodiment, storefront queues 535 are separately based on status indictor 530. For example, storefront queues 535 may include an occupied queue for occupied storefronts and a vacancy queue from vacant storefronts. Each storefront queue 535 may have a different or similar frequency of monitoring transaction data 515. In certain embodiments, VI computing device 112 may be configured to monitor transaction data 515 for transaction associated with particular storefronts of one storefront queue 535 at an increased frequency relative to other storefronts within the same storefront queue 535. For example, storefronts that are not associated with transactions within transaction data 515 may be monitored more frequently to determine whether or not the storefront is vacant.

In the example embodiment, when storefront profile 525 is added to one storefront queue 535, an entry for storefront profile 525 is generated within storefront queue 535. Similarly, when storefront profile 525 is removed or transferred to another storefront queue 535, the generated entry may be deleted from the original storefront queue 535. In the example embodiment, storefront profile 525 is transferred between storefront queues 535 when status indicator 530 is changed (e.g., from "Vacant" to "Occupied"). In other embodiments, storefront profile 525 may be transferred between storefront queues 535 in response to other information associated with storefront profile 525.

VI computing device 112 is further configured to receive a registration request 540 from at least one user, such as merchant 24. Merchant 24 is requesting to monitor one or more storefronts for any vacancies through VI computing device 112. Registration request 540 may include contact information of merchant 24 to enable VI computing device 112 to notify or alert merchant 24 of vacant storefronts. Registration request 540 further includes one or more desired storefronts and/or storefront attributes that merchant 24 is requesting to monitor. If registration request 540 includes desired storefront attributes, VI computing device 112 may present merchant 24 with a set of storefronts profiles 525 based on the desired storefront attributes. Merchant 24 may select storefronts to be monitored from the set of storefront profiles 525. In some embodiments, the merchant may request to monitor a storefront that is not associated with any storefront profiles 525, and VI computing device 112 may generate a new storefront profile 525 for the storefront.

In at least some embodiments, VI computing device 112 is further configured to generate a user or merchant profile 545 for each merchant associated with a received registration request 540. Merchant profile 545 includes the contact information of merchant 24 and at least a portion of registration request 540. Merchant profile 545 may include additional information about merchant 24, such as a category of merchant 24 (e.g., clothes, toys, furniture, etc.) and number of merchant locations operated by merchant 24.

In the example embodiment, VI computing device 112 is further configured to determine the vacancy of a storefront based on transaction data 515. Specifically, VI computing device 112 determines a storefront associated with each transaction of transaction data 515. Alternatively, VI computing device 112 may analyze transaction data 515 to identify transaction data associated with particular storefronts. Based on the volume and/or frequency of transactions processed at each storefront, VI computing device 112 may identify one or more storefronts as potentially vacant. In one example, a storefront may be identified as potentially vacant if transaction data 515 does not include any transaction associated with the storefront. In another example, the storefront may be identified as potentially vacant if transaction data 515 includes a number of transactions below a predefined threshold value. VI computing device 112 may observe additional transaction data 515 over a different period of time to confirm that the storefront is vacant. In other embodiments, VI computing device 112 may notify property management 560 of the potentially vacant storefronts and prompt property management 560 to confirm.

If the storefront is determined to be vacant, VI computing device 112 updates status indicator 530 to indicate that the storefront is vacant. VI computing device 112 may update storefront profile 525 to remove the current occupant and/or add the current occupant to a list of previous occupants. VI computing device 112 is configured to transmit a notification 550 to one or more merchants 24 indicating or advising that the storefront is now vacant. In response, merchant 24 may contact property management 560 to potentially buy, rent, lease, or otherwise occupy the storefront. In some embodiments, notification 550 includes contact information of property management 560.

In at least some embodiments, VI computing device 112 may be configured to generate a priority list 555 that ranks interested merchants to facilitate controlled negotiation between the interested merchants and property management 560. VI computing device 112 may transmit notification 550 to one or more merchants with higher priority before transmitting to merchants with lower priority. Priority list 555 may be ranked by, for example, duration of interest, number of matching attributes of the merchant and the storefront, and a custom ranking by property management 560. The duration of interest indicates how long a merchant has been registered to monitor the storefront. The number of matching attributes of the merchant and the storefront indicates the number of desired storefront attributes of the merchant and desired merchant attributes of property management 560 that match the merchant and the storefront. Property management 560 may create a customized priority list 555 or alter an existing priority list 555 to fit the interests of the commercial property. For example, property management 560 may place a higher priority on toy merchants than clothing merchants to meet demand for more toy merchants. In one embodiment, a real estate agent associated with property management 560 may select interested merchants to prioritize. After a predetermined period of time or after receiving an indication that no agreement was made between the merchants that received notification 550 and property management 560, VI computing device 112 may transmit notification 550 to the next merchant(s) on priority list 555.

In another embodiment, VI computing device 112 may transmit notification 550 to a plurality of interested merchants to auction the vacant storefront. VI computing device 112 may be configured to receive bids for the vacant storefront until a highest bidder is determined. In one example, the auction is conducted to gain priority to negotiate with property management 560. In another example, the auction is conducted to determine a buyer, renter, or lease of the storefront. VI computing device 112 may be configured to enable property management 560 to accept or decline the highest bidder.

In the example embodiment, VI computing device 112 determines the storefront has been occupied based on additional transaction data 515. In some embodiments, property management 560 may notify the storefront has been occupied. VI computing device 112 updates status indicator 530 and storefront profile 525 to indicate the storefront is occupied.

Figure 6:
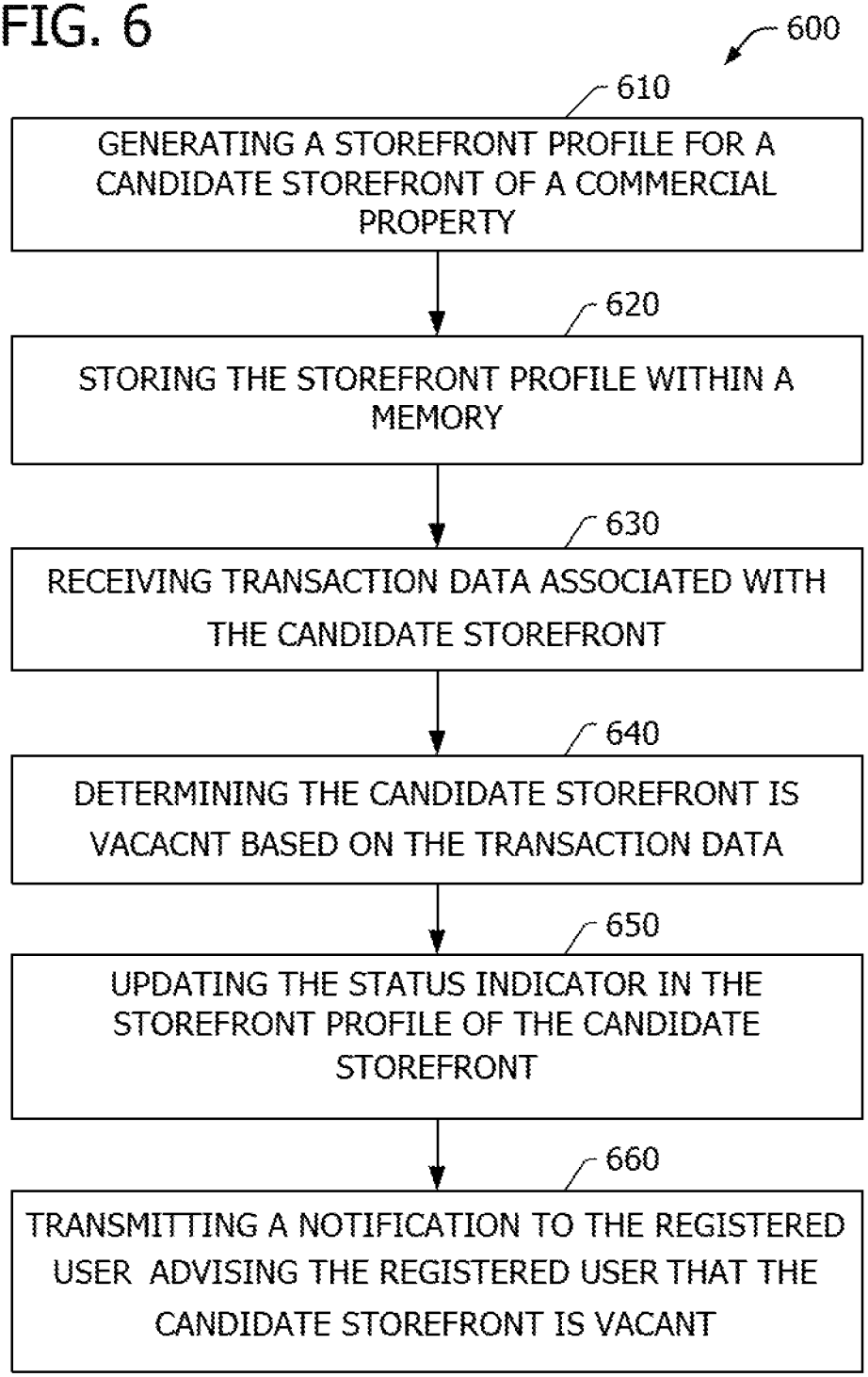
FIG. 6 is a simplified diagram of an example method of identifying commercial vacancies using the systems of FIGS. 2, 3, and 4.

FIG. 6 is a diagram of an example method 600 for identifying commercial vacancies using a commercial vacancy system (e.g., system 500, shown in FIG. 5). In the example embodiment, method 600 is implemented by a VI computing device. In other embodiments, method 600 may include additional, fewer, or alternative steps for identifying commercial vacancies, including those described elsewhere herein.

Method 600 begins with the VI computing device generating 610 a storefront profile for a candidate storefront located at a commercial property. In the example embodiment, the commercial property is a mall. The storefront profile includes a status indicator to indicate whether or not the candidate storefront is vacant. The VI computing device stores 620 the storefront profile within a memory associated with the VI computing device, such as a database or a memory integrated in the VI computing device. In some embodiments, the VI computing device receives a registration request from one or more users requesting to monitor the candidate storefront. In certain embodiments, the VI computing device generates 610 the storefront profile in response to the registration request. The VI computing device may generate a user profile for each user associated with the received registration requests.

In the example embodiment, the VI computing device receives 630 transaction data associated with at least the candidate storefront. The VI computing device may receive 630 the transaction data from a payment network. The transaction data includes transactions at the candidate storefront over a predetermined period of time. For each transaction of the transaction data, the VI computing device may identify a corresponding storefront. The VI computing device determines 640 whether or not the candidate storefront is vacant based on the transaction data. In one embodiment, the VI computing device determines 640 the candidate storefront is vacant if the transaction data does not include any transactions associated with the candidate storefront within the predetermined period of time (e.g., the past two weeks). In another embodiment, the VI computing device determines 640 the candidate storefront is vacant if the transaction data includes a number of transactions associated with the candidate storefront below a predetermined threshold value. If the transaction data includes one or more transactions associated with the candidate storefront profile, the VI computing device may determine 640 that the candidate storefront is occupied.

The VI computing device updates 650 the status indicator in the storefront profile of the candidate storefront. For example, if the VI computing device determined 640 that the candidate storefront is vacant, the status indicator is updated 650 to indicate the vacancy. The VI computing device transmits 660 a notification to a registered merchant (i.e., a merchant associated with a merchant profile) advising the registered merchant that the candidate storefront is vacant. In certain embodiments, the registered merchant has the highest priority on a priority list of registered merchants that the VI computing device has generated. The notification may also be sent to one or more additional registered merchants. The VI computing device may conduct an auction for the candidate storefront among the registered merchants. The VI computing device may identify a highest bidder and notify a property management of the commercial property of the highest bidder.

Figure 7:
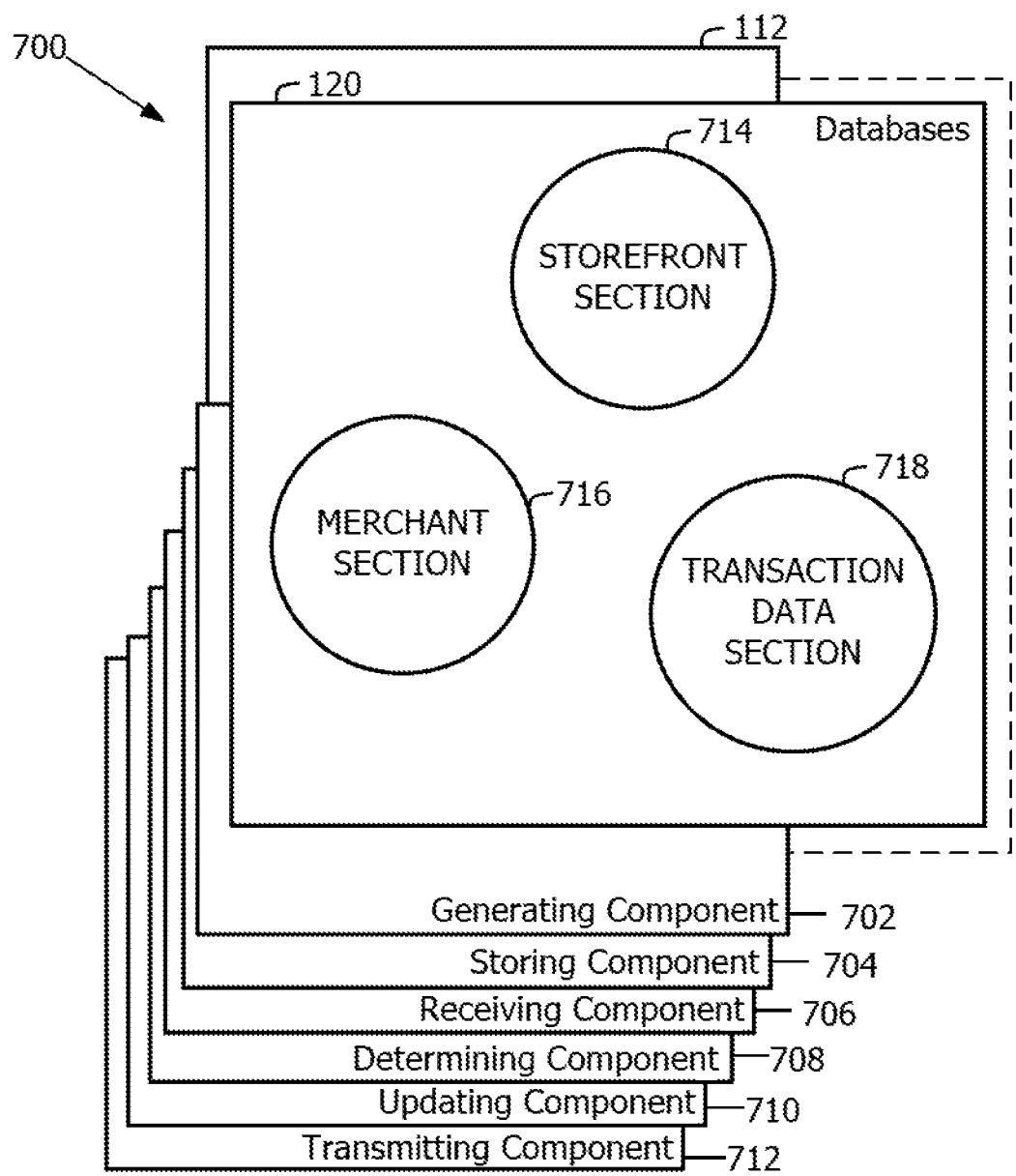
FIG. 7 is a diagram of components of one or more example computing devices that may be used in the environment shown in FIG. 6.

FIG. 7 is a diagram 700 of components of one or more example computing devices that may be used in the environment shown in FIG. 6. FIG. 7 further shows a configuration of databases including at least database 120 (shown in FIG. 1). Database 120 is coupled to several separate components within VI computing device 112, which perform specific tasks.

VI computing device 112 includes a generating component 702 configured to generating a storefront profile with a status indicator for a candidate storefront located at a commercial property. VI computing device 112 also includes a storing component 704 configured to storing the storefront profile within a memory associated with VI computing device 112. VI computing device additionally includes a receiving component 706 configured to receiving transaction data associated with at least the candidate storefront and a determining component 708 configured to determining whether or not the candidate storefront is vacant based on the transaction data. VI computing device 112 further includes an updating component 710 configured to update the status indicator to indicate that the candidate storefront is vacant and a transmitting component 712 configured to transmit a notification to a registered merchant advising the registered merchant that the candidate storefront is vacant.

In an exemplary embodiment, database 120 is divided into a plurality of sections, including but not limited to, a storefront section 714, a merchant section 716, and transaction data section 718. These sections within database 120 are interconnected to update and retrieve the information as required. Storefront section 714 may include, for example, storefront profiles of one or more commercial properties. Merchant section 716 may include merchant profiles of merchants registered to be notified of commercial vacancies. Transaction data section 718 may include historical transaction data of a plurality of storefronts.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A vacancy identification (VI) computing device in communication with a payment processing network configured to process payment transactions using a set of proprietary communication standards for the exchange of financial transaction data and the settlement of funds between financial institutions that are members of the payment processing network, the VI computing device including a processor and a non-transitory computer-readable storage media, said processor in communication with a memory device, the non-transitory computer-readable storage media having instructions stored thereon that, in response to execution by said processor, cause said processor to:

establish, in the memory device, a first storefront queue associated with a first timing schedule;

establish, in the memory device, a second storefront queue associated with a second timing schedule;

generate a plurality of storefront profiles corresponding to a plurality of candidate storefronts, wherein each storefront profile includes a status indicator indicating that the candidate storefront is one of occupied by a current occupant and vacant;

add, to each storefront profile having the status of occupied, a merchant identifier that identifies a corresponding merchant on the payment processing network, wherein the merchant identifier is associated by the payment processing network with a location identifier corresponding to the candidate storefront;

receive, via the Internet from each of a plurality of user computing devices associated with a plurality of users, a respective registration request, each registration request including storefront attributes of interest for a respective potential user storefront;

transmit, to each of the user computing devices via the Internet, a respective subset of the plurality of storefront profiles matching the respective storefront attributes of interest;

receive, from each of the user computing devices, a respective selection of at least one candidate storefront profile from the subset of storefront profiles;

register each user to monitor the respective at least one candidate storefront for a vacancy;

parse each user selection of the at least one candidate storefront profile according to the respective status indicator;

add each respective user selection having the status indicator of occupied to the first storefront queue established in the memory device;

add each respective user selection having the status indicator of vacant to the second storefront queue established in the memory device;

monitor transaction data processed over the payment processing network on the first timing schedule, to identify transaction data associated with the storefronts of the first storefront queue to monitor a status of the occupied storefronts, the transaction data being formatted according to the set of proprietary communication standards to include one of the merchant identifiers for each transaction, wherein the transaction data associated with the storefronts of the first storefront queue is identified using the respective merchant identifier in the corresponding storefront profile;

monitor the transaction data processed over the payment processing network on the second timing schedule, to identify transaction data associated with the storefronts of the second storefront queue to monitor a status of the vacant storefronts, wherein the first timing schedule is more frequent than the second timing schedule;

determine that a first candidate storefront of a first candidate store profile of the at least one candidate storefront profile of at least one of the users has become vacant based on the transaction data monitored using the respective merchant identifier associated with the first candidate storefront;

update the status indicator in the first candidate storefront profile to indicate that the first candidate storefront is vacant;

transfer, in the memory device, the storefront profile for the first candidate storefront from the first storefront queue to the second storefront queue;

generate a notification notifying the registered at least one user of the vacancy, the notification including contact information of a property manager associated with the first candidate storefront; and transmit the generated notification to a respective user computing device associated with the registered at least one user to alert the registered at least one user that the first candidate storefront is vacant.

2. The VI computing device of claim 1, wherein the processor is further configured to generate a user profile for each registered user, wherein each user profile indicates the corresponding registered user is monitoring the respective at least one candidate storefront.

3. The VI computing device of claim 2, wherein the processor is further configured to:
generate a priority list including the at least one user monitoring the first candidate storefront based on at least one of the first candidate storefront profile and the user profiles; and
transmit the notification to a user on the priority list with the highest priority advising the user on the priority list that the first candidate storefront is vacant.

4. The VI computing device of claim 2, wherein the processor is further configured to:
transmit the notification to the users monitoring the first candidate storefront indicating that the storefront is vacated;
receive one or more bids from the users monitoring the first candidate storefront to determine a highest bidder; and
transmit at least a portion of the user profile of the highest bidder to a property management computing device associated with the first candidate storefront.

5. The VI computing device of claim 1, wherein the payment processing network is configured to process a plurality of payment transactions for a plurality of merchants having a plurality of storefronts to determine the first candidate storefront is vacant by determining, from the transaction data monitored using the respective merchant identifier, that a number of transactions processed at the first candidate storefront has declined over a predetermined period of time.

6. The VI computing device of claim 1, wherein the transaction data includes a location identifier for a card present transaction, the location identifier representing a location of the merchant where the card present transaction was initiated, and wherein the processor is configured to analyze the location identifier to identify whether the card present transaction was initiated at the first candidate storefront during a predetermined period of time.

7. A computer-implemented method for identifying commercial vacancies using a vacancy identification (VI) computing device in communication with a payment processing network configured to process payment transactions using a set of proprietary communication standards for the exchange of financial transaction data and the settlement of funds between financial institutions that are members of the payment processing network, the VI computing device including a processor and a non-transitory computer-readable storage media, the processor in communication with a memory device, the method comprising:

establishing, in the memory device, by the processor, a first storefront queue associated with a first timing schedule;

establishing, in the memory device, by the processor, a second storefront queue associated with a second timing schedule;

generating, by the processor, a plurality of storefront profiles corresponding to a plurality of candidate storefronts, wherein each storefront profile includes a status indicator indicating that the candidate storefront is one of occupied by a current occupant and vacant;

adding, to each storefront profile having the status of occupied, a merchant identifier that identifies a corresponding merchant on the payment processing network, wherein the merchant identifier is associated by the payment processing network with a location identifier corresponding to the candidate storefront;

receiving, via the Internet from each of a plurality of user computing devices associated with a plurality of users, a respective registration request, each registration request including storefront attributes of interest for a respective potential user storefront;

transmitting, to each of the user computing devices via the Internet, a respective subset of the plurality of storefront profiles matching the respective storefront attributes of interest;

receiving, from each of the user computing devices, a respective selection of at least one candidate storefront profile from the subset of storefront profiles;

registering each user to monitor the respective at least one candidate storefront for a vacancy;

parsing each user selection of the at least one candidate storefront profile according to the respective status indicator;

adding each respective user selection having the status indicator of occupied to the first storefront queue established in the memory device;

adding each respective user selection having the status indicator of vacant to the second storefront queue established in the memory device;

monitoring, by the processor, transaction data processed over the payment processing network on the first timing schedule, to identify transaction data associated with the storefronts of the first storefront queue to monitor a status of the occupied storefronts, the transaction data being formatted according to the set of proprietary communication standards to include one of the merchant identifiers for each transaction, wherein the transaction data associated with the storefronts of the first storefront queue is identified using the respective merchant identifier in the corresponding storefront profile;

monitoring, by the processor, the transaction data processed over the payment processing network on the second timing schedule, to identify transaction data associated with the storefronts of the second storefront queue to monitor a status of the vacant storefronts, wherein the first timing schedule is more frequent than the second timing schedule;

determining that a first candidate storefront of a first candidate store profile of the at least one candidate storefront profile of at least one of the users has become vacant based on the transaction data monitored using the respective merchant identifier associated with the first candidate storefront;

updating the status indicator in the first candidate storefront profile to indicate that the first candidate storefront is vacant;

transferring, by the processor, in the memory device, the storefront profile for the first candidate storefront from the first storefront queue to the second storefront queue;

generating a notification notifying the registered at least one user of the vacancy, the notification including contact information of a property manager associated with the first candidate storefront; and transmitting, by the VI computing device, the generated notification to a respective user computing device the registered at least one user to alert the registered user that the first candidate storefront is vacant.

8. The computer-implemented method of claim 7 further comprising generating, by the processor, a user profile for each registered user, wherein each user profile indicates the corresponding registered user is monitoring the respective at least one candidate storefront.

9. The computer-implemented method of claim 8 further comprising:

generating a priority list including the at least one user monitoring the first candidate storefront based on at least one of the first candidate storefront profile and the user profiles, wherein transmitting the notification further comprises transmitting the notification to a user on the priority list with the highest priority advising the user on the priority list that the first candidate storefront is vacant.

10. The computer-implemented method of claim 8, wherein transmitting the notification further comprises:

transmitting, by the processor, the notification to the users monitoring the first candidate storefront indicating that the storefront is vacated;

receiving, by the processor, one or more bids from the users monitoring the first candidate storefront to determine a highest bidder; and transmitting at least a portion of the user profile of the highest bidder to a property management computing device associated with the first candidate storefront.

11. The computer-implemented method of claim 7, wherein the payment processing network is configured to process a plurality of payment transactions for a plurality of merchants have a plurality of storefronts; and wherein determining that the first candidate storefront is vacant based on the transaction data further comprises determining, by the processor, from the transaction data monitored using the respective merchant identifier, that a number of transactions processed at the first candidate storefront has declined over a predetermined period of time.

12. The computer-implemented method of claim 7, wherein the transaction data includes a location identifier for a card present transaction, the location identifier representing a location of the merchant where the card present transaction was initiated, and wherein determining that the first candidate storefront is vacant based on the transaction data further comprises analyzing, by the processor, the location identifier to identify whether the card present transaction was initiated at the candidate storefront during a predetermined period of time.

13. A non-transitory computer-readable storage media for identifying commercial vacancies, the non-transitory computer-readable storage media having computer-executable instructions embodied thereon, wherein, when executed by a vacancy identification (VI) computing device in communication with a payment processing network configured to process payment transactions using a set of proprietary communication standards for the exchange of financial transaction data and the settlement of funds between financial institutions that are members of the payment processing network, the VI computing device including at least one processor in communication with a memory device, the computer-executable instructions cause the processor to:

establish, in the memory device, a first storefront queue associated with a first timing schedule;

establish, in the memory device, a second storefront queue associated with a second timing schedule;

generate a plurality of storefront profiles corresponding to a plurality of candidate storefronts, wherein each storefront profile includes a status indicator indicating that the candidate storefront is one of occupied by a current occupant and vacant;

add, to each storefront profile having the status of occupied, a merchant identifier that identifies a corresponding merchant on the payment processing network, wherein the merchant identifier is associated by the payment processing network with a location identifier corresponding to the candidate storefront;

receive, via the Internet from each of a plurality of user computing devices associated with a plurality of users, a respective registration request, each registration request including storefront attributes of interest for a respective potential user storefront;

transmit, to each of the user computing devices via the Internet, a respective subset of the plurality of storefront profiles matching the respective storefront attributes of interest;

receive, from each of the user computing devices, a respective selection of at least one candidate storefront profile from the subset of storefront profiles;

register each user to monitor the respective at least one candidate storefront for a vacancy;

parse each user selection of the at least one candidate storefront profile according to the respective status indicator;

add each respective user selection having the status indicator of occupied to the first storefront queue established in the memory device;

add each respective user selection having the status indicator of vacant to the second storefront queue established in the memory device;

monitor transaction data processed over the payment processing network on the first timing schedule, to identify transaction data associated with the storefronts of the first storefront queue to monitor a status of the occupied storefronts, the transaction data being formatted according to the set of proprietary communication standards to include one of the merchant identifiers for each transaction, wherein the transaction data associated with the storefronts of the first storefront queue is identified using the respective merchant identifier in the corresponding storefront profile;

monitor the transaction data processed over the payment processing network on the second timing schedule, to identify transaction data associated with the storefronts of the second storefront queue to monitor a status of the vacant storefronts, wherein the first timing schedule is more frequent than the second timing schedule;

determine that a first candidate storefront of a first candidate store profile of the at least one candidate storefront profile of at least one of the users has become vacant based on the transaction data monitored using the respective merchant identifier associated with the first candidate storefront;

update the status indicator in the first candidate storefront profile to indicate that the first candidate storefront is vacant;

transfer, in the memory device, the storefront profile for the first candidate storefront from the first storefront queue to the second storefront queue;

generate a notification notifying the registered at least one user of the vacancy, the notification including contact information of a property manager associated with the first candidate storefront; and transmit the generated notification to a respective user computing device associated with the registered at least one user that the first candidate storefront is vacant.

14. The non-transitory computer-readable storage claim 13, wherein the computer-executable instructions further cause the processor to generate a user profile for each registered user, wherein each user profile indicates the corresponding registered user is monitoring the respective at least one candidate storefront.

15. The non-transitory computer-readable storage claim 14, wherein the computer-executable instructions further cause the processor to:

generate a priority list including the at least one user monitoring the first candidate storefront based on at least one of the first candidate storefront profile and the user profiles; and transmit the notification to a user on the priority list with the highest priority advising the user on the priority list that the first candidate storefront is vacant.

16. The non-transitory computer-readable storage media of claim 14, wherein the computer-executable instructions further cause the processor to:

transmit the notification to the users monitoring the first candidate storefront indicating that the storefront is vacated;

receive one or more bids from the users monitoring the first candidate storefront to determine a highest bidder; and transmit at least a portion of the user profile of the highest bidder to a property management computing device associated with the first candidate storefront.

17. The non-transitory computer-readable storage claim 13, wherein the payment processing network is configured to process a plurality of payment transactions for a plurality of merchants have a plurality of storefronts; and wherein the computer-executable instructions further cause the processor to determine, by the processor, the first candidate storefront is vacant by determining from the transaction data monitored using the respective merchant identifier that a number of transactions processed at the first candidate storefront has declined over a predetermined period of time.

18. The non-transitory computer-readable storage claim 13, wherein the transaction data includes a location identifier for a card present transaction, the location identifier representing a location of the merchant where the card present transaction was initiated, and wherein the computer-executable instructions further cause the processor to analyze the location identifier to identify whether the card present transaction was initiated at the first candidate storefront during a predetermined period of time.

* * * * *